(12) United States Patent
Daczko et al.

(10) Patent No.: US 12,556,238 B2
(45) Date of Patent: Feb. 17, 2026

(54) ADAPTIVE SIGNAL FORMING FOR RADIO FREQUENCY SPECTRUM SHARING WITH INTERFERENCE SUPPRESSION

(71) Applicant: The Boeing Company, Arlington, VA (US)

(72) Inventors: Mateus S. Daczko, Olympia, WA (US); Stephen J. Young, Seattle, WA (US)

(73) Assignee: The Boeing Company, Arlington, VA (US)

( * ) Notice: Subject to any disclaimer, the term of this patent is extended or adjusted under 35 U.S.C. 154(b) by 367 days.

(21) Appl. No.: 18/172,886

(22) Filed: Feb. 22, 2023

(65) Prior Publication Data
US 2024/0283496 A1    Aug. 22, 2024

(51) Int. Cl.
*H04W 72/56*     (2023.01)
*H04B 7/0426*    (2017.01)
(Continued)

(52) U.S. Cl.
CPC .............. *H04B 7/043* (2013.01); *H04B 7/063* (2013.01); *H04W 72/541* (2023.01); *H04W 72/56* (2023.01)

(58) Field of Classification Search
CPC ...... H04B 7/043; H04B 7/063; H04B 7/0617; H04B 1/7097; H04B 17/252;
(Continued)

(56) References Cited

U.S. PATENT DOCUMENTS

| 5,425,000 A * | 6/1995 | Reed ....................... G01S 7/529 367/901 |
| 9,594,153 B1 * | 3/2017 | Oroskar ................ H04W 24/00 |

(Continued)

OTHER PUBLICATIONS

Z. Tang and A. Manikas, "Direction-of-Arrival Tracking of Multiple Fast-Moving Sources in Antenna Array based Access Networks," ICC 2020—2020 IEEE International Conference on Communications (ICC), Dublin, Ireland, 2020, pp. 1-6 (Year: 2020).*

(Continued)

*Primary Examiner* — Robert W Hodge
*Assistant Examiner* — Bongani Jabulani Mashele
(74) *Attorney, Agent, or Firm* — Alleman Hall LLP (57) ABSTRACT

Examples are disclosed that relate to adaptively adjusting a radio frequency (RF) signal to suppress interference with radio operation of a prioritized RF system while maintaining radio operation of a non-prioritized RF system. In one example, a system includes an antenna array, a RF signal detection subsystem, and a signal-forming subsystem. The RF signal detection subsystem is configured to detect a prioritized RF signal in a prioritized RF spectrum band and determine an angle of arrival of the prioritized RF signal. The signal-forming subsystem is configured to output a non-prioritized RF signal based at least on the angle of arrival. A radiation null is formed along the angle of arrival in a radiation pattern of the non-prioritized RF signal. The signal-forming subsystem is configured to transmit the non-prioritized RF signal via the antenna array.

20 Claims, 6 Drawing Sheets

(51) Int. Cl.
*H04B 7/06* (2006.01)
*H04W 72/541* (2023.01)

(58) Field of Classification Search
CPC ... H04W 72/541; H04W 72/56; H04W 16/14; G01S 13/933; G01S 3/02; G01S 7/0236; G01S 7/021; G01S 3/74; G01S 3/8006; G01S 7/403; G01S 7/4034; G01S 13/44
See application file for complete search history.

(56) References Cited

U.S. PATENT DOCUMENTS

| | | | |
|---|---|---|---|
| 2010/0075607 A1* | 3/2010 | Hosoya | H04B 7/086 455/42 |
| 2022/0021419 A1* | 1/2022 | Zaidi | G01S 13/4454 |

OTHER PUBLICATIONS

European Patent Office, Extended European Search Report Issued in Application No. 24151952.9, Jun. 18, 2024, Germany, 7 pages.

* cited by examiner

ADAPTIVE SIGNAL FORMING FOR RADIO FREQUENCY SPECTRUM SHARING WITH INTERFERENCE SUPPRESSION

FIELD

This disclosure relates generally to the field of radio frequency (RF) communication and more specifically to adaptive control of RF signals.

BACKGROUND

Operation of one radio frequency (RF) system can interfere with operation of another RF system. In one example, a cellular base station includes a cellular antenna array that is designed to point towards the ground to transmit cellular RF signals to enable cellular communication with nearby cellular devices. However, in some instances, a portion of a cellular RF signal can leak through sidelobes of the cellular antenna array in unintended directions, such as up into the air. These wayward cellular RF signals can interfere with the operation of highly sensitive airborne radar systems of aircraft within and beyond the range of the cellular base station. For example, such cellular RF signal interference can reduce radar detection range and probability of detection, and trigger false alarms, among other issues. It is therefore desirable to suppress RF signal interference between different RF systems.

SUMMARY

Examples are disclosed that relate to adaptively adjusting a radio frequency (RF) signal to suppress interference with radio operation of a prioritized RF system while maintaining radio operation of a non-prioritized RF system. In one example, a system includes an antenna array, a RF signal detection subsystem, and a signal-forming subsystem. The RF signal detection subsystem is configured to detect a prioritized RF signal in a prioritized RF spectrum band and determine an angle of arrival of the prioritized RF signal. The signal-forming subsystem is configured to output a non-prioritized RF signal based at least on the angle of arrival of the prioritized RF signal. A radiation null is formed along the angle of arrival of the prioritized RF signal in a radiation pattern of the non-prioritized RF signal. The signal-forming subsystem is configured to transmit the non-prioritized RF signal via the antenna array.

The features, functions, and advantages that have been discussed can be achieved independently in various embodiments or may be combined in yet other embodiments further details of which can be seen with reference to the following description and drawings.

DETAILED DESCRIPTION

It is desirable to suppress radio frequency (RF) signals transmitted by one RF system from interfering with operation of another RF system. Existing RF systems do not detect the presence of proximate RF signals from different RF systems and thus can interfere continuously with the different RF systems. Other proposed approaches only attempt to detect the presence of incoming RF signals from different RF systems and temporarily shut down based on such detection. While such an approach eliminates any potential interference, the RF system does not provide RF transmission/communication functionality while it is temporarily shut down. As such, the local RF system network capacity is degraded and RF devices in the area can experience degraded and/or intermittent network service while the RF system is shut down.

Accordingly, examples are disclosed that relate to adaptively adjusting an RF signal transmitted by a non-prioritized RF system to suppress interference with operation of a prioritized RF system while maintaining RF communication functionality of the non-prioritized RF system. In one example, a system includes an antenna array, a RF signal detection subsystem, and a signal-forming subsystem. The RF signal detection subsystem is configured to detect a prioritized RF signal in a prioritized RF spectrum band and determine an angle of arrival (AoA) of the prioritized RF signal. The signal-forming subsystem is configured to output a non-prioritized RF signal based at least on the angle of arrival of the prioritized RF signal. A radiation null is formed along the prioritized RF signal's angle of arrival in a radiation pattern of the non-prioritized RF signal. The signal-forming subsystem is configured to transmit the non-prioritized RF signal via the antenna array.

Note that the prioritized RF signal can be prioritized over the non-prioritized RF signal for any suitable reason. In some examples, the prioritized RF signal is prioritized over the non-prioritized RF signal based at least on governmental communication regulations. In other examples, the prioritized RF signal is prioritized over the non-prioritized RF signal based at least on the type of RF signals and/or the RF spectrum band of the RF signals. As one example, the prioritized RF signal can be more sensitive to interference than the non-prioritized RF signal. In still other examples, the prioritized RF signal is prioritized over the non-prioritized RF signal based at least on the objectives of the developers of the RF systems.

The technical feature of dynamically placing a radiation null along the angle of arrival of the prioritized RF signal in a radiation pattern of the non-prioritized RF signal provides the technical benefit of suppressing interference towards the source of the prioritized RF signal while also keeping the non-prioritized RF system active to provide uninterrupted RF communication with surrounding RF devices. In this way, local RF network capacity and RF network service can be maintained even when sources of prioritized RF signals are present in relative proximity to the non-prioritized RF system.

Figure 1:
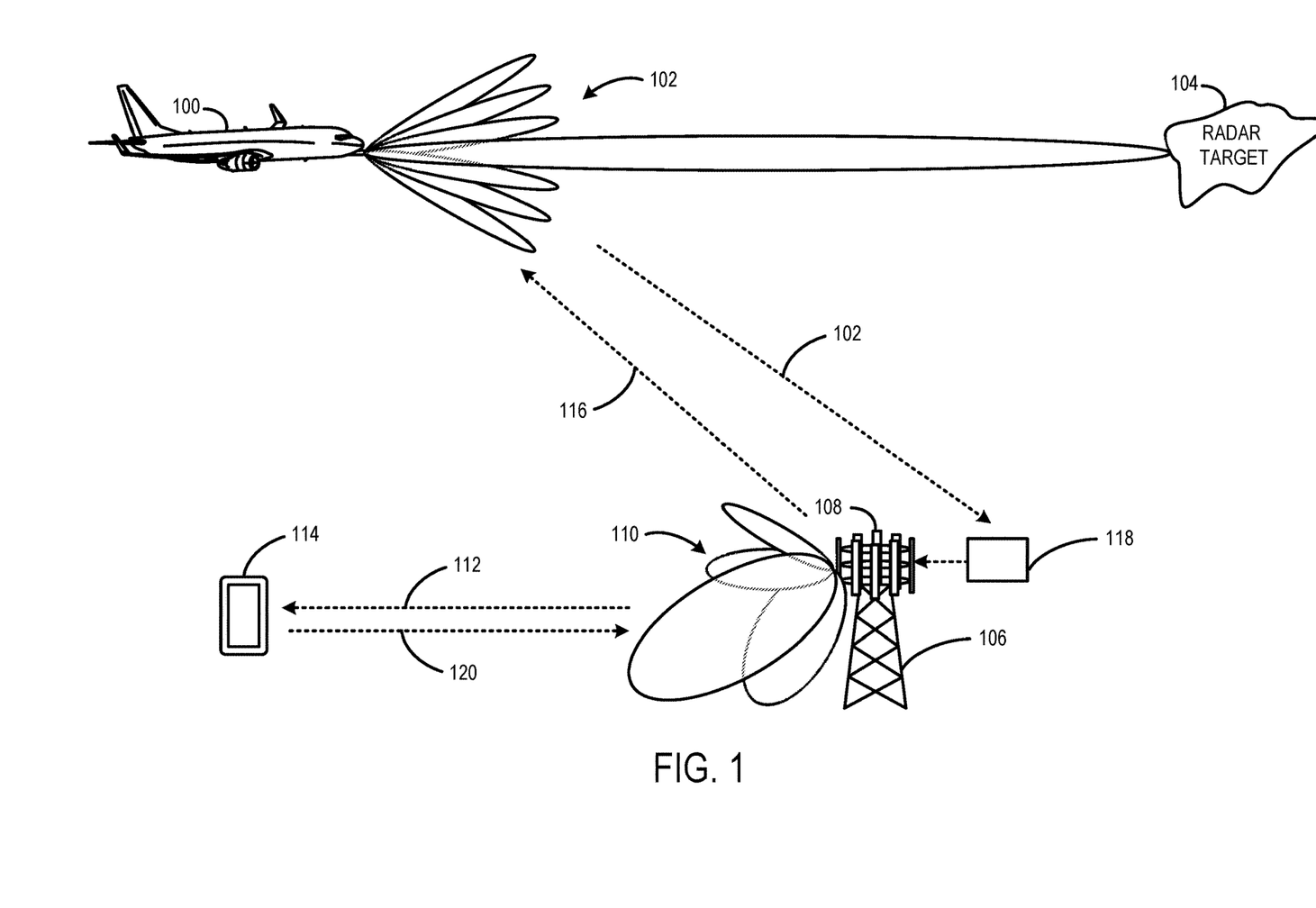
FIG. 1 shows an example scenario in which a cellular base station system operates in proximity to a source of airborne radar.

FIG. 1 shows an example scenario in which a cellular base station system operates in proximity to a source of airborne radar. In this example, airborne radar signals are prioritized RF signals and cellular RF signals are non-prioritized RF signals. More particularly, an aircraft 100 transmits airborne radar signals 102 to detect a distant radar target 104 and determine a distance between the aircraft 100 and the radar target 104. The radar target 104 can be any suitable object, such as another aircraft. In other examples, the aircraft 100 can transmit the airborne radar signals 102 for another purpose, such as to measure altitude of the aircraft 100 (e.g., via a radar altimeter), weather radar, navigational assistance, and air traffic control. The aircraft 100 can transmit the airborne radar/communication signals 102 for any suitable purpose.

A cellular base station system 106 includes an antenna array 108 that transmits cellular RF signals 110 to enable cellular communication with nearby cellular devices. The antenna array 108 is designed to point towards the ground to provide cellular ground coverage. In the illustrated example, the cellular base station system 106 transmits a beamformed RF signal 112 via the antenna array 108 to a cellular device 114 to enable cellular communication between the cellular base station system 106 and the cellular device 114.

As discussed above, without some form of mitigation, some portion 116 of the cellular RF signals 110 could leak through sidelobes of antennas of the antenna array 108 up into the air and interfere with airborne radar operation of the aircraft 100. For example, such cellular signal interference can reduce radar detection range, reduce radar probability of detection, and trigger false alarms, among other issues. The interference caused by the leaked cellular signal 114 may be particularly strong in examples where the cellular base station system 106 is a gNodeB base station that transmits 5G cellular signals. The gNodeB base station can transmit 5G cellular signals in the S-band, which is also used to in airborne radar systems. Such overlap in the same spectrum band increases the likelihood/strength of interference.

Thus, the cellular base station system 106 includes a detection subsystem 118 that detect the airborne radar signal 102. In some examples, the airborne radar signal 102 is a portion (e.g., radar chirps) that is leaked from a primary signal, in a manner similar to that of the leaked cellular signal 116. The detection subsystem 118 determines an angle of arrival of the airborne radar signal 102. Further, the cellular base station system 106 outputs a beamformed RF signal 112 based at least on the angle of arrival of the airborne radar signal 102. A radiation null is formed along the angle of arrival of the airborne radar signal 102 in a radiation pattern of the beamformed RF signal 112. The cellular base station system 106 transmits the beamformed signal 112 to the cellular device 114. Further, the cellular device 114 transmits a cellular RF signal 120 to the cellular base station 106 based at least on receiving the beamformed RF signal 112 to enable maintain cellular communication between the cellular base station 106 and the cellular device 114.

By forming the radiation null along the angle of arrival of the airborne radar signal in the radiation pattern of the beamformed RF signal 112, the signal strength of the beamformed RF signal 112 in that direction is attenuated, such that little or no radio waves leak toward the aircraft 100. On the other hand, a peak radiated power of the beamformed RF signal 112 is directed toward the cellular device 114 to maintain cellular communication between the cellular base station system 106 and the cellular device 114. The cellular base station system 106 provides the technical benefit of allowing for co-existence and uninterrupted operation of both the airborne radar operation of the aircraft 100 and the cellular RF communication functionality of the cellular base station system 106.

The cellular base station system 106 is provided as a non-limiting example of a non-prioritized RF system that suppresses cellular RF interference with airborne radar operation of a prioritized RF system (e.g., on the aircraft) while maintaining cellular RF communication with local cellular devices. In other examples, other types of RF systems may perform such operations.

Figure 2:
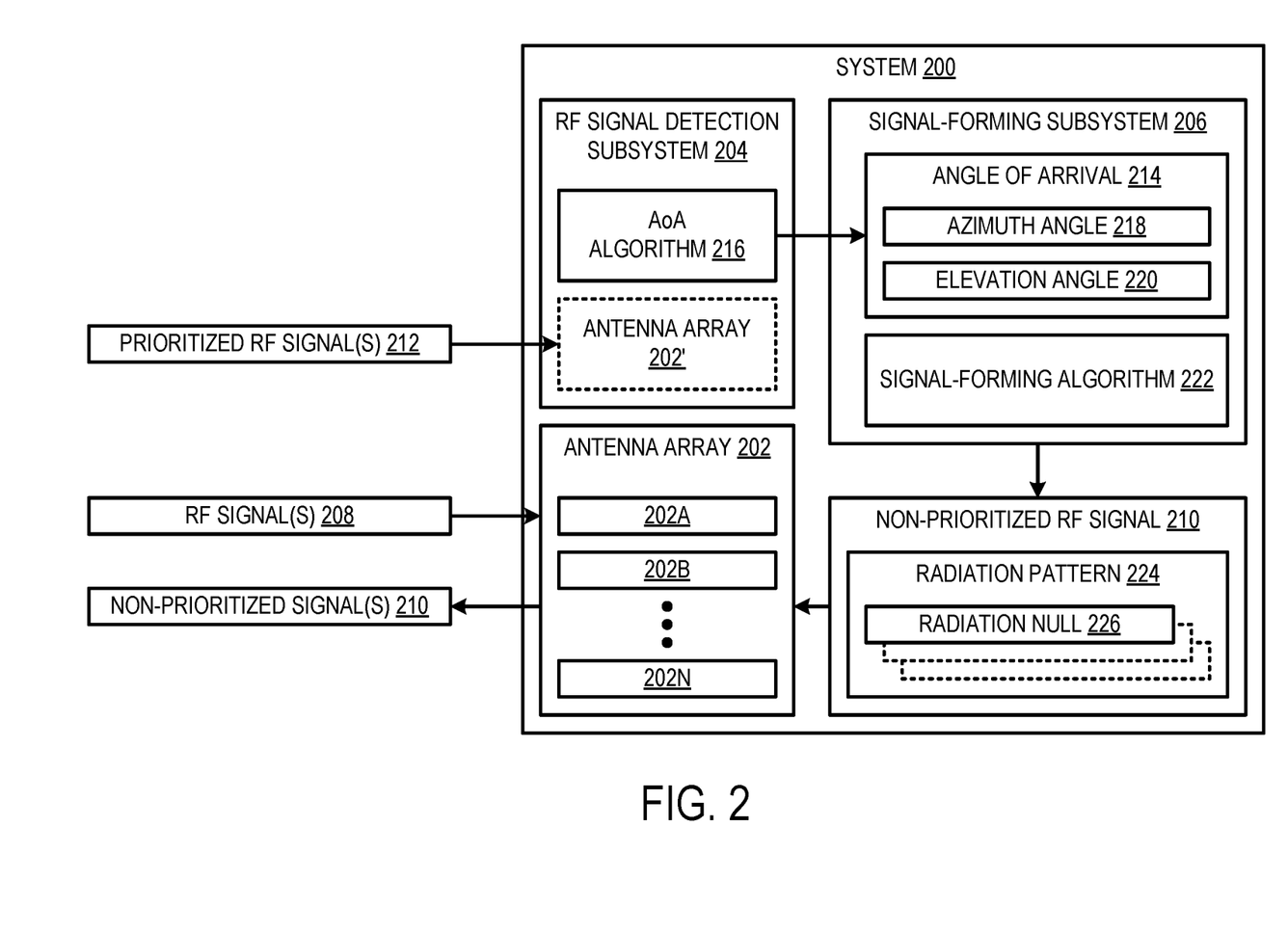
FIG. 2 shows a block diagram representing an example radio frequency (RF) system.

FIG. 2 shows a block diagram of an example RF system 200. The RF system 200 is configured to suppress RF interference with RF operation of a prioritized RF system while maintaining RF communication with local RF devices via transmission of non-prioritized RF signals. For example, the RF system 200 may represent the cellular base station system 106 shown in FIG. 1. The RF system 200 includes an antenna array 202, a RF signal detection subsystem 204, and a signal-forming subsystem 206.

The antenna array 202 includes a plurality of antennas 202A, 202B, 202N. The antenna array 202 can include any suitable number of antennas to allow for the capture of the phase of a signal at different antennas of the antenna array 202. In some examples, the antenna array 202 is a stationary electronically scannable phased array of antennas. In some examples, the antenna array 202 includes multiple input and multiple output (MIMO) antennas that increase the resiliency (signal-to-noise ratio/SNR) of a transmitted signal and the channel capacity, without increasing spectrum usage. The antenna array 202 can include any suitable type of antennas.

The antenna array 202 is configured to receive RF signals 208 from various RF devices (e.g., the cellular device 114 shown in FIG. 1) within signal range of the RF system 200. The RF signals 208 can take any suitable form and can occupy any suitable spectrum band of the electromagnetic spectrum. In one example, the RF signals 208 are 5G cellular RF signals that can fall within the S-Band (e.g., 15-7.5 CM wavelength range/2-4 GHz frequency range) of the electromagnetic spectrum. Further, the antenna array 202 is configured to transmit different RF signals 210 to different RF devices to enable RF communication with the different RF devices. The RF signals received and transmitted by the antenna array 202 are non-prioritized RF signals.

The RF signal detection subsystem 204 is configured to detect (or receive) prioritized RF signals 212 in a prioritized RF spectrum band. The prioritized RF signals 212 are deemed to have priority over the non-prioritized RF signals 208, 210. In one example, such priority means non-prioritized RF signals have to be adjusted to suppress interference with radio operation of the prioritized RF system. The prioritized RF spectrum band may be any suitable RF spectrum band/range, licensed or not, in the electromagnetic spectrum. The prioritized RF signals 212 may correspond to any suitable RF communication/sensing operation. In one example, the prioritized RF signals 212 are airborne radar signals from various airborne sources (e.g., the aircraft 100 shown in FIG. 1) within signal range of the RF system 200. In other examples, the RF signal detection subsystem 204 is configured to detect radar signals from other sources that are not airborne, such as from radar systems of land- or aquatic-based vehicles. In still other examples, the prioritized RF signals may operate in any other current or previously restricted RF spectrum band potentially enabling commercial use of spectrum that would otherwise be off-limits.

In some embodiments, the RF signal detection subsystem 204 includes a separate antenna array 202' that is configured to detect the prioritized RF signals 212. In one example, the antenna array 202' is configured to detect airborne radar signals. The antenna array 202' can include any suitable number and/or type of antennas.

In other embodiments, the RF signal detection subsystem 204 can detect the prioritized RF signals 212 via the antenna array 202. In other words, the antenna array 202 may be used to detect the prioritized RF signals 212 and send/receive non-prioritized RF signals 208, 210.

The RF signal detection subsystem 204 is configured determine an angle of arrival 214 of the prioritized RF signal 212 using an angle of arrival (AoA) algorithm 216. In some examples, the angle of arrival 214 is represented by an azimuth angle 218 and an elevation angle 220 relative to the position of the RF system 200.

The RF signal detection subsystem 204 can be configured to use any suitable angle of arrival algorithm to determine the angle of arrival 214 of the prioritized RF signal 212. In one example, the RF signal detection subsystem 204 is configured to determine the angle of arrival 214 of the prioritized RF signal 212 based on a MUltiple SIgnal Classification (MUSIC) algorithm. In this example, the prioritized RF signal is an airborne radar signal. The algorithm is performed as follows. First, a correlation matrix $\hat{R}$ is estimated from the radar signal vector x detected at the cellular base station system 200. The correlation matrix $\hat{R}$ is represented as:

$$\hat{R} = \frac{1}{N}\sum_{n=1}^{N} x_n x_n^H$$

where N is the number of snapshots, and $x^H$ denotes the Hermitian of signal vector x. Next, eigen decomposition is performed according to $\hat{R}=V\lambda V^H$, where V is the eigenvector and Λ contains the corresponding eigenvalues. A pseudo angular spectrum P(θ) is computed using:

$$P(\theta) = \frac{1}{a^H(\theta)VV^H a(\theta)}$$

where a(θ) is the array manifold of the antenna array 202 of the cellular base station system 200 and is a known quantity that can be measured or simulated prior to deployment. The angle of arrival of the airborne radar signal can be determined by tracking the peak in the pseudo angular spectrum P(θ) and taking into account any position offset between the antenna array 202 and the RF signal detection subsystem 204 (if applicable).

Figure 3:
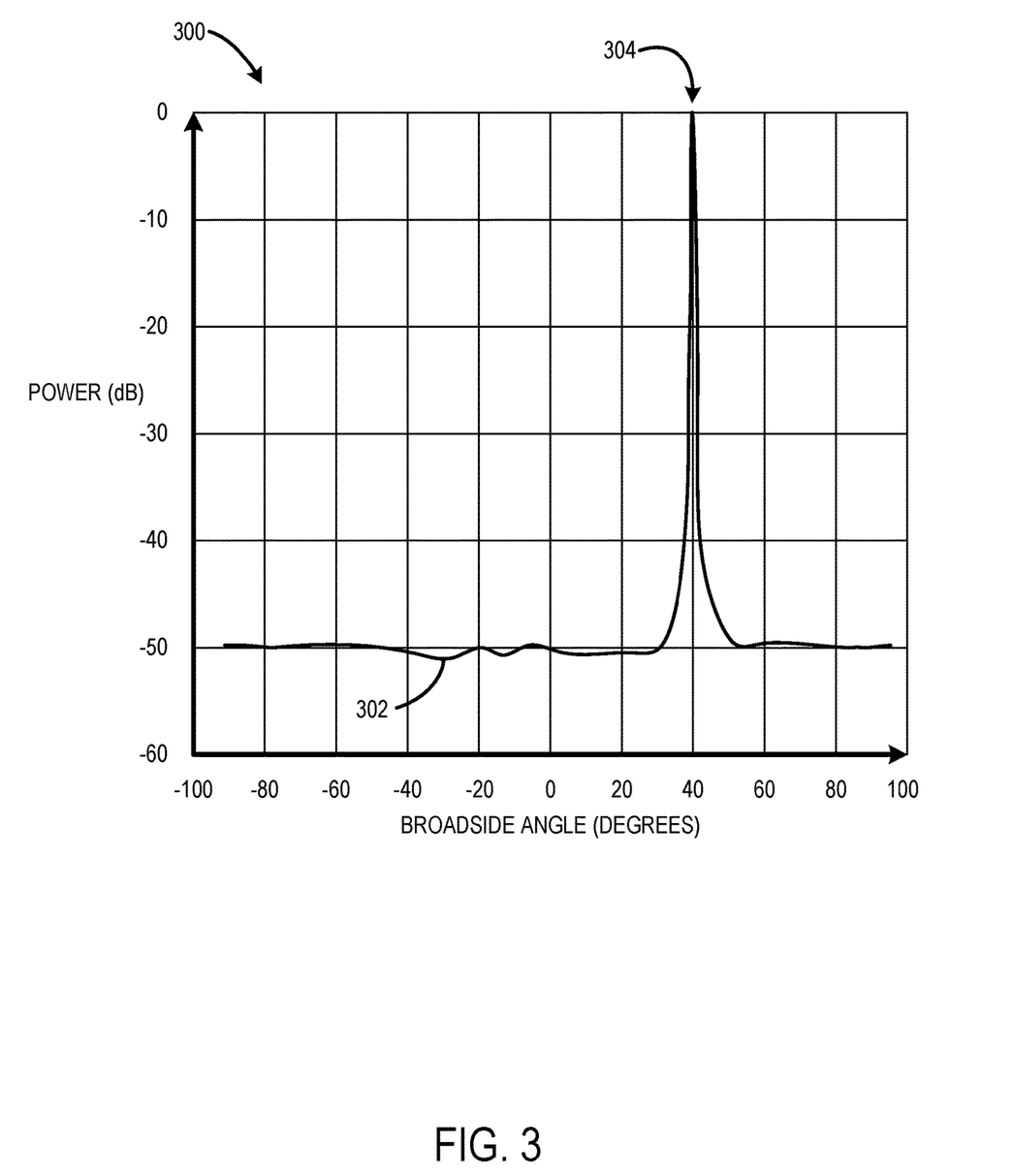
FIG. 3 shows a graph depicting an example angle of arrival of an airborne radar signal.

FIG. 3 shows a graph 300 depicting an example angle of arrival of an airborne radar signal determined using the MUSIC algorithm. The graph 300 plots broadside angle (degrees) vs signal power (dB). A waveform 302 represents the pseudo angular spectrum on the graph 300. The waveform 302 includes a peak 304 corresponding to the angle of arrival of the airborne radar signal. In this example, the angle of arrival is located at 40° broadside of the cellular base station system. The graph 300 is provided as a non-limiting example. The angle of arrival may be determined to be any suitable angle relative to the RF system 200.

Returning to FIG. 2, the MUSIC algorithm is provided as a non-limiting example of an angle of arrival algorithm 216 that the RF signal detection subsystem 204 can use to determine the angle of arrival 214 of the prioritized RF signal 212. In other examples, the RF signal detection subsystem 204 can determine the angle of arrival 214 of the prioritized RF signal 212 based on a different angle of arrival algorithm, such as an Estimation of Signal Parameters via Rotational Invariant Techniques (ESPRIT) algorithm. In some examples, the RF signal detection subsystem 204 can determine the angle of arrival 214 of the prioritized RF signal 212 based on a plurality of different angle of arrival algorithms. For example, the RF signal detection subsystem 204 can compare/combine the results of the different angle of arrival algorithms to make a final determination of the angle of arrival. Such an approach provides a more robust determination of an angle of arrival balanced against the cost of increased consumption of processing resources. In still other examples, the RF signal detection subsystem 204 includes a monopulse tracker that is configured to determine the angle of arrival/direction of the incoming prioritized RF signals.

The signal-forming subsystem 206 is configured to receive the angle of arrival 214 of the prioritized signal 212 from the RF signal detection subsystem 204. The signal-forming subsystem 206 is configured to output a non-prioritized RF signal 210 based at least on the angle of arrival 214 of the prioritized RF signal 212.

The non-prioritized RF signal 210 forms a radiation pattern 224 including a radiation null 226 placed along the angle of arrival 214 of the prioritized RF signal 212. By forming the radiation null along the angle of arrival 214 of the prioritized RF signal 212, the signal strength of the non-prioritized RF signal 210 in that direction is attenuated, such that nominal signal leaks toward the source of the prioritized RF signal 212. On the other hand, a peak radiated power of the non-prioritized RF signal 210 is directed toward a RF device in communication with the RF system 200. This allows for the RF system 200 to maintain RF communication with the RF device while suppressing interference with radio operation of the prioritized RF system.

The signal-forming subsystem 206 is configured to output the non-prioritized RF signal 210 based at least on a signal-forming algorithm 222. Further, the signal-forming subsystem 206 is configured to transmit the non-prioritized RF signal 210 via the antenna array 202 to facilitate RF communication between the RF system 200 and a RF device.

The signal-forming subsystem 206 can use any suitable signal-forming algorithm to place the radiation null 226 along the angle of arrival 214 of the prioritized RF signal 212 in the radiation pattern 224 of the non-prioritized RF signal 210. In some examples, the non-prioritized RF signal 210 is a beamformed signal. In one example, the signal-forming subsystem 206 uses a linearly constrained minimum variance (LCMW) algorithm to place the radiation null 226 along the angle of arrival 214. In other examples, the signal-forming subsystem 206 can use other adaptive beamforming algorithms, such as a minimum variance distortionless response (MVDR) algorithm or a Frost beamformer algorithm to perform radiation null placement/beamformed signal generation. In other examples, the signal-forming subsystem 206 is configured to output the non-prioritized RF signal 210 via signal hopping between different frequencies outside of the prioritized RF spectrum band. In still other examples, the signal-forming subsystem 206 is configured to output the non-prioritized RF signal 210 via RF multiplexing in different frequencies outside of the prioritized RF spectrum band.

Figure 4:
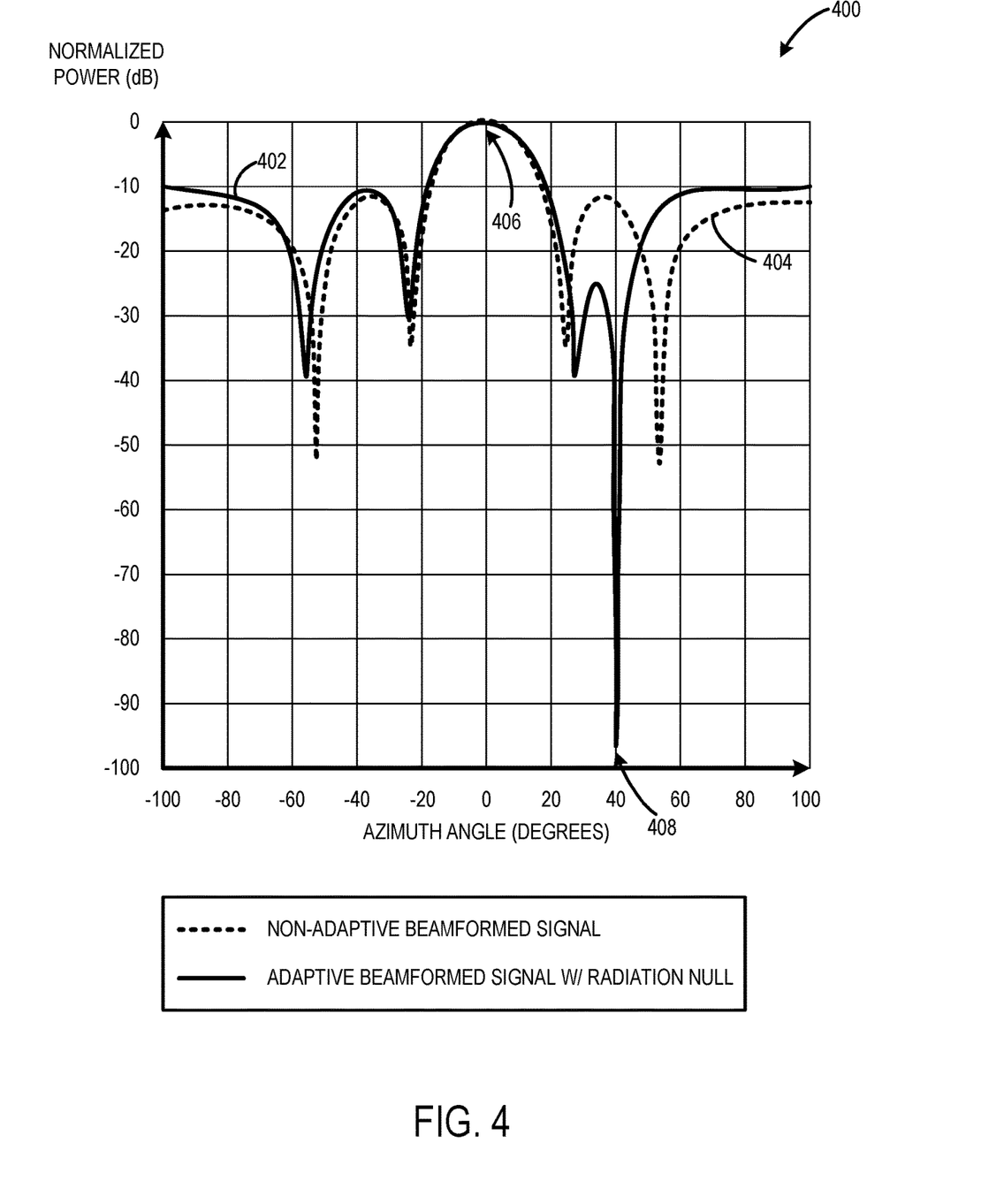
FIG. 4 shows a graph depicting an example radiation pattern of a beamformed signal including a radiation null placed at a determined angle of arrival of an airborne radar signal.

FIG. 4 shows a graph 400 depicting an example radiation pattern of an adaptive beamformed signal 402 compared to a radiation pattern of a non-adaptive beamformed signal. For example, the adaptive beamformed signal 402 corresponds to the non-prioritized RF signal 210 shown in FIG. 2. The graph 400 plots azimuth angle (degrees) vs normalized signal power (dB). Both the adaptive beamformed signal 402 and the non-adaptive beamformed signal 404 have a peak radiated power 406 at zero degrees (0°) that corresponds to the direction of the cellular device with which the cellular base station system is communicating. Further, the adaptive beamformed signal 402 has a radiation null 408 positioned at an azimuth angle of 40° that corresponds to the angle of arrival of the airborne radar signal in this example. The radiation null 408 attenuates the signal strength of the adaptive beamformed signal 402 in that direction, such that nominal signal leaks toward the source of the airborne radar signal. In this way, the adaptive beamformed signal 402 suppresses interference with airborne radar operation. In contrast, the non-adaptive beamformed signal 402 does not include a radiation null at the angle of arrival, and thus radio waves leak from the non-adaptive beamformed signal 404 in the direction of the angle of arrival and interfere with airborne radar operation. The graph 400 is provided as a non-limiting example. A radiation null can be placed at any suitable azimuth and elevation angle corresponding to an angle of arrival of an airborne radar signal.

Returning to FIG. 2, in some implementations, the RF system 200 is configured to dynamically update the non-prioritized RF signal 210 to adjust for changes in position of the source of the prioritized RF signal 212 as the source moves relative to the RF system 200. In one example, the radar detection subsystem 204 detects a first prioritized RF signal from a source. The radar detection subsystem 204 determines an angle of arrival of the first prioritized RF signal. The signal-forming subsystem 206 outputs a non-prioritized RF signal based at least on the angle of arrival of the first prioritized RF signal. Subsequently, the radar detection subsystem 204 detects a second prioritized RF signal from the same source as the first prioritized RF signal and determines the angle of arrival of the second prioritized RF signal. The signal-forming subsystem 206 outputs an updated non-prioritized RF signal based at least on the angle of arrival of the second prioritized RF signal. The updated non-prioritized RF signal has a radiation pattern including a radiation null that is formed along the angle of arrival of the second prioritized RF signal. In this way, the RF system 200 can dynamically update the non-prioritized RF signal to accurately suppress interference with RF operation of the source as the source moves relative to the RF system 200.

In some examples, the RF system 200 is configured to dynamically update the angle of arrival and/or the non-prioritized RF signal according to a designated update rate. In some examples, update rate is predetermined (e.g., a static update rate). In other examples, the update rate is based at least on detection of a prioritized RF signal—e.g., the non-prioritized RF signal can be dynamically updated each time a prioritized RF signal associated with the same source is detected. In still other examples, the update rate varies based at least on a distance between the source of the prioritized RF signals and the RF system and a velocity of the source. For example, the update rate can increase as the distance between the source of the prioritized RF signals and the RF system decreases and/or the velocity of the source increases. In particular, movement of the source more acutely affects the angle of arrival as the source moves closer to the RF system. Thus, by varying the update rate in this manner, the angle of arrival of prioritized RF signals can be accurately updated to track the movement of the source relative to the RF system 200.

In some implementations, the RF system 200 is configured to adaptively adjust the non-prioritized RF signal 210 to suppress interference with RF operation of multiple sources. In one example, the radar detection subsystem 204 detects a first prioritized RF signal from a first source and determines an angle of arrival of the first prioritized RF signal. The radar detection subsystem 204 detects a second prioritized RF signal from a second source and determines an angle of arrival of the second prioritized RF signal. The signal-forming subsystem 206 outputs a non-prioritized RF signal based at least on the angle of arrival of the first prioritized RF signal and the angle of arrival of the second prioritized RF signal. The non-prioritized RF signal has a radiation pattern including a first radiation null formed along the angle of arrival of the first prioritized RF signal and a second radiation null formed along the angle of arrival of the prioritized RF radar signal.

By including multiple radiation nulls corresponding to the different angles of arrival of the different prioritized RF signals, the non-prioritized RF signal is adaptively adjusted to suppress interference with RF operation of multiple sources at the same time. The RF system 200 may be configured to adaptively adjust the non-prioritized RF signal to suppress interference with RF operation of any suitable number of different sources (e.g., aircraft) based at least on a number of antenna elements in the antenna array 202. For example, a N-element antenna array can form (N−1) nulls in a radiation pattern of a non-prioritized RF signal.

In the illustrated implementation, the RF signal detection subsystem 204 and the signal-forming subsystem 206 are integrated with the antenna array 202 in the RF system 200. In other implementations, the RF signal detection subsystem and the signal-forming subsystem are included in a physically separate computing system that is communicatively coupled with the RF system. For example, such a separate computing system can be communicatively coupled with a legacy RF system, such as a legacy cellular base station system that lacks the ability to detect prioritized RF signals (e.g., airborne radar signals) and determine an angle of elevation of the prioritized RF signal. The separate computing system can be communicatively coupled with a legacy RF system to provide the adaptive RF interference suppression functionality disclosed herein. In such separate system, in some embodiments, the RF signal detection subsystem 204 may include signal processing circuitry, such as digital signal processors (DSPs), inputs/outputs to the antenna array 202, de-modulation circuitry, power conversion circuitry to power the RF signal detection subsystem 204, and/or other circuit components. Further, the signal-forming subsystem 206 may include signal modulation circuitry, inputs/outputs to the antenna array 202, power conversion circuitry to power the subsystem 206, signal generation circuitry, and/or other circuit components. The RF signal detection subsystem 204 and/or the signal-forming subsystem 206 may include computer-executable instructions (e.g., code) stored in the same memory or separate memory devices to cause the logic processor to perform the processes described herein.

Figure 5:
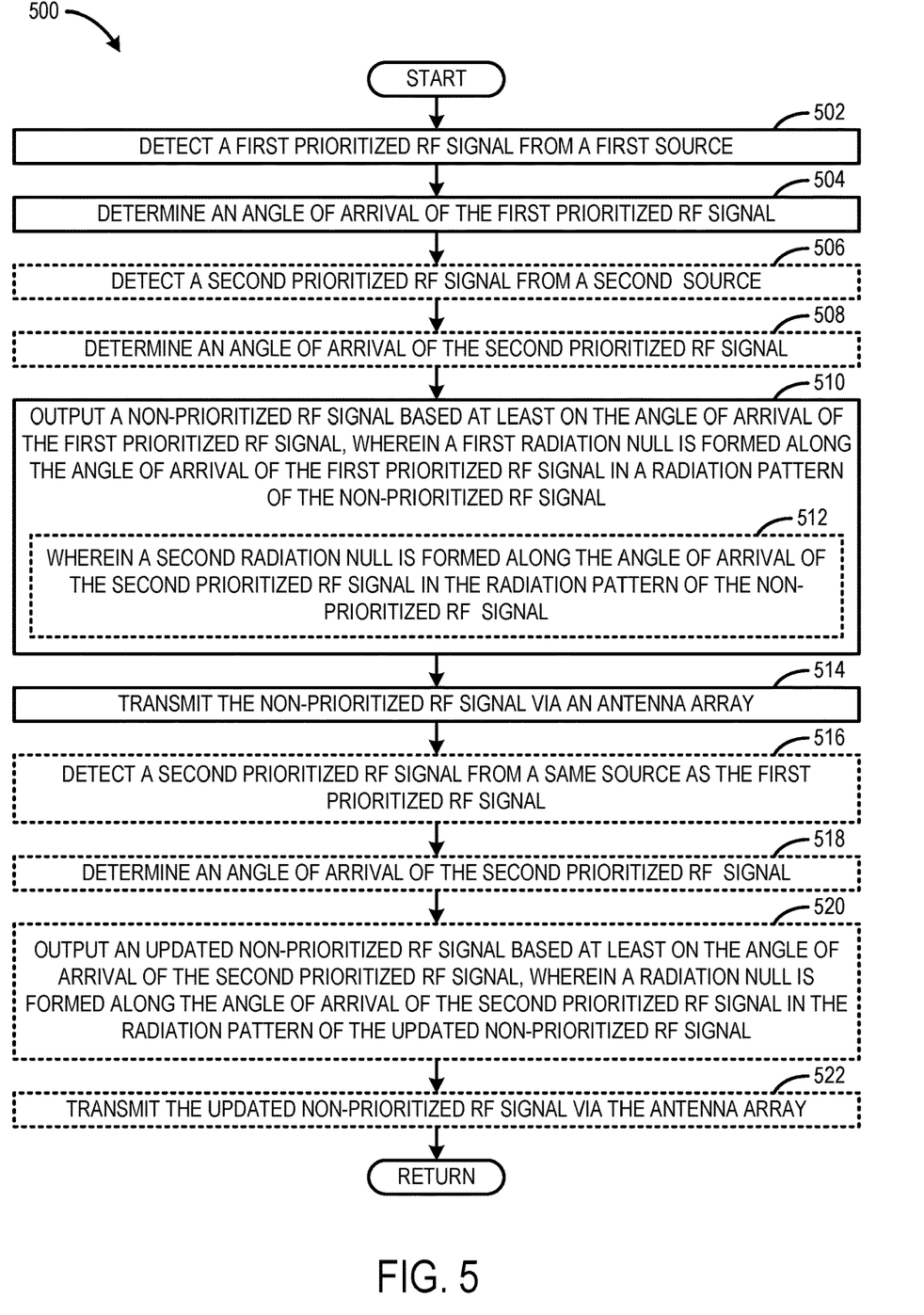
FIG. 5 shows a flow chart of an example method for adaptively adjusting a RF signal to suppress interference with radio operation of a prioritized RF system while maintaining operation of a non-prioritized RF system.

FIG. 5 shows a flow chart of an example method 500 for adaptively adjusting a RF signal to suppress interference with radio operation of a prioritized RF system while maintaining radio operation of a non-prioritized RF system. For example, the method 500 can be performed by the cellular base station system 106 shown in FIG. 1 and the RF system 200 shown in FIG. 2.

At 502, the method 500 includes detecting a first prioritized RF signal from a first source.

At 504, the method 500 includes determining an angle of arrival of the first prioritized RF signal. In one example, the first prioritized RF signal is an airborne radar signal. In some examples, the angle of arrival of the first prioritized RF signal is determined using MUSIC algorithm or ESPRIT algorithm. In other examples, the angle of arrival of the first prioritized RF signal is determined using a monopulse tracker.

In some implementations, at 506, the method 500 optionally may include detecting a second prioritized RF signal from a second source. At 508, the method 500 optionally may include determining an angle of arrival of the second prioritized RF signal.

At 510, the method 500 includes outputting a non-prioritized RF signal based at least on the angle of arrival of the first prioritized RF signal, wherein a first radiation null is formed along the angle of arrival of the first prioritized RF signal in a radiation pattern of the non-prioritized RF signal. In some examples, the first radiation null is placed at the angle of arrival of the first prioritized RF signal using at least one of a LCMW algorithm, a MVDR algorithm, or a Frost beamformer algorithm. In one example, the non-prioritized RF signal is a cellular RF signal, and more particularly, a 5G cellular RF signal.

In implementations where the second prioritized RF signal from the second source is detected, at 512, a second radiation null is formed along the angle of arrival of the second prioritized RF signal in the radiation pattern of the non-prioritized RF signal.

At 514, the method 500 includes transmitting the non-prioritized RF signal via the antenna array.

In some implementations, at 516, the method 500 optionally may include detecting a second prioritized RF signal from a same source as the first prioritized RF signal. At 518, the method 500 optionally may include determining an angle of arrival of the second prioritized RF signal. At 520, the method 500 optionally may include outputting an updated non-prioritized RF signal based at least on the angle of arrival of the second prioritized RF signal, wherein a radiation null is formed along the angle of arrival of the second prioritized RF signal in the radiation pattern of the updated non-prioritized RF signal. At 522, the method 500 optionally may include transmitting the updated non-prioritized RF signal via the antenna array. In some implementations, the angles of arrival and/or the non-prioritized RF signal optionally may be dynamically updated according to a designated update rate. In some implementations, the designated update rate varies based at least on a distance between the source of the prioritized RF signals and a RF system that transmits the non-prioritized RF signal and/or a velocity of the source.

The method may be performed to adaptively adjust a RF signal transmitted by a non-prioritized RF system to suppress interference with radio operation of a prioritized RF system while maintaining radio operation of the non-prioritized RF system. Although examples are described in the context of suppressing interference with airborne radar operation, the concepts described herein are broadly applicable to suppressing interference with other types of RF signals that are deemed to be prioritized as well.

In some implementations, the methods and processes described herein may be tied to a computing system of one or more computing devices. In particular, such methods and processes may be implemented as computer hardware, a computer-application program or service, an application-programming interface (API), a library, and/or other computer-program product.

Figure 6:
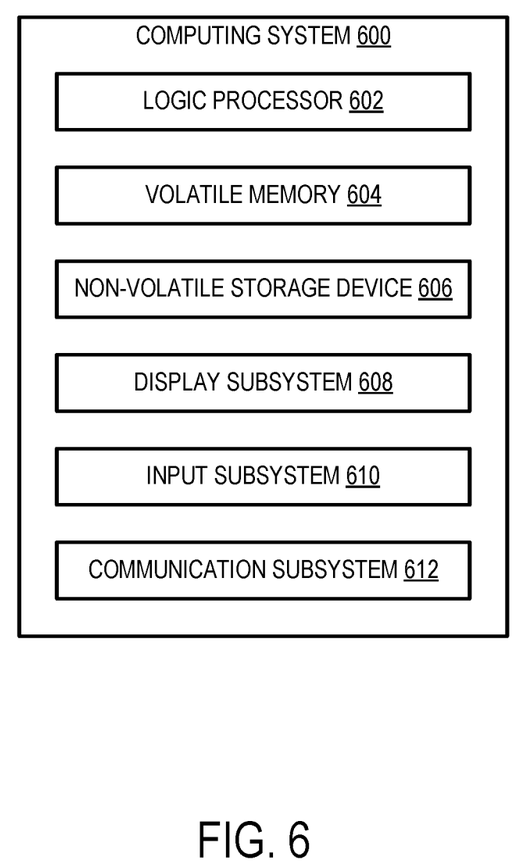
FIG. 6 shows a block diagram presenting an example computing system.

FIG. 6 schematically shows a non-limiting implementation of a computing system 600 that can enact one or more of the methods and processes described above. Computing system 600 is shown in simplified form. Computing system 600 may embody the aircraft 100 (/ the radar system of the aircraft 100), the cellular base station system 106, and the cellular device 114 shown in FIG. 1 and the RF system 200 shown in FIG. 2, or any other computing device described herein. Computing system 600 may take the form of one or more server computing devices, cloud computing devices, network computing devices, integrated computing devices, Internet of things (IoT) computing devices, mobile computing devices, mobile communication devices (e.g., smartphone), and/or other computing devices.

Computing system 600 includes a logic processor 602, volatile memory 604, and a non-volatile storage device 606. Computing system 600 may optionally include a display subsystem 608, input subsystem 610, communication subsystem 612, and/or other components not shown in FIG. 6.

Logic processor 602 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 602 may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 602 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 606 includes one or more physical devices configured to hold instructions executable by the logic processors to implement the methods and processes described herein. When such methods and processes are implemented, the state of non-volatile storage device 606 may be transformed—e.g., to hold different data.

Non-volatile storage device 606 may include physical devices that are removable and/or built-in. Non-volatile storage device 606 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 606 may include nonvolatile, dynamic, static, read/write, read-only, sequential-access, location-addressable, file-addressable, and/or content-addressable devices. It will be appreciated that non-volatile storage device 606 is configured to hold instructions even when power is cut to the non-volatile storage device 606.

Volatile memory 604 may include physical devices that include random access memory. Volatile memory 604 is typically utilized by logic processor 602 to temporarily store information during processing of software instructions. It will be appreciated that volatile memory 604 typically does not continue to store instructions when power is cut to the volatile memory 604.

Aspects of logic processor 602, volatile memory 604, and non-volatile storage device 606 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 608 may be used to present a visual representation of data held by non-volatile storage device 606. The visual representation may take the form of a graphical user interface (GUI). As the herein described methods and processes change the data held by the non-volatile storage device, and thus transform the state of the non-volatile storage device, the state of display subsystem 608 may likewise be transformed to visually represent changes in the underlying data. Display subsystem 608 may include one or more display devices utilizing virtually any type of technology. Such display devices may be combined with logic processor 602, volatile memory 604, and/or non-volatile storage device 606 in a shared enclosure, or such display devices may be peripheral display devices.

When included, input subsystem 610 may comprise or interface with one or more user-input devices such as a keyboard, mouse, touch screen, microphone for speech and/or voice recognition, a camera (e.g., a webcam), or game controller.

When included, communication subsystem 612 may be configured to communicatively couple various computing devices described herein with each other, and with other devices. Communication subsystem 612 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some implementations, the communication subsystem may allow computing system 600 to send and/or receive messages to and/or from other devices via a network such as the Internet.

In one example, a system comprises an antenna array, a radio frequency (RF) signal detection subsystem configured to 1) detect a prioritized RF signal in a prioritized RF spectrum band, and 2) determine an angle of arrival of the prioritized RF signal, and a signal-forming subsystem configured to 1) output a non-prioritized RF signal based at least on the angle of arrival of the prioritized RF signal and 2) transmit, via the antenna array, the non-prioritized RF signal, wherein a radiation null is formed along the angle of arrival in a radiation pattern of the non-prioritized RF signal emitted by the antenna array. In this example and/or other examples, the prioritized RF signal may be an airborne radar signal and the non-prioritized RF signal is a cellular signal. In this example and/or other examples, the signal-forming subsystem may be configured to output a beamformed non-prioritized RF signal, and a peak radiated power of the beamformed non-prioritized RF signal may be directed toward a target in the radiation pattern of the beamformed non-prioritized RF signal. In this example and/or other examples, the signal-forming subsystem may be configured to output the non-prioritized RF signal via signal hopping between different frequencies outside of the prioritized RF spectrum band. In this example and/or other examples, the signal-forming subsystem may be configured to output the non-prioritized RF signal via RF multiplexing in different frequencies outside of the prioritized RF spectrum band. In this example and/or other examples, the angle of arrival may be represented by an azimuth angle and an elevation angle. In this example and/or other examples, the prioritized RF signal may be a first prioritized RF signal, the RF signal detection subsystem may be configured to 1) detect a second prioritized RF signal from a same source as the first prioritized RF signal, and 2) determine an angle of arrival of the second prioritized RF signal; and the signal-forming subsystem may be configured to output an updated non-prioritized RF signal based at least on the angle of arrival of the second prioritized RF signal, a radiation null may be formed along the angle of arrival of the second prioritized RF signal in the radiation pattern of the updated non-prioritized RF signal. In this example and/or other examples, the RF signal detection subsystem may be configured to dynamically update the angles of arrival and/or the non-prioritized RF signal according to a designated update rate. In this example and/or other examples, the designated update rate may vary based at least on a distance between the source of the prioritized RF signals and the system and a velocity of the source. In this example and/or other examples, the prioritized RF signal may be a first prioritized RF signal from a first source, the RF signal detection subsystem may be configured to 1) detect a second prioritized RF signal from a second source, and 2) determine an angle of arrival of the second prioritized RF signal; and the signal-forming subsystem may be configured to output the non-prioritized RF signal based at least on the angle of arrival of the first prioritized RF signal and the angle of arrival of the second prioritized RF signal, a first radiation null may be formed along the angle of arrival of the first prioritized RF signal and a second radiation null may be formed along the angle of arrival of the second prioritized RF signal in the radiation pattern of the non-prioritized RF signal. In this example and/or other examples, the RF signal detection subsystem may be configured to determine the angle of arrival of the prioritized RF signal using at least one of a multiple signal classification (MUSIC) algorithm or an estimation of signal parameters via rotational invariant techniques (ESPRIT) algorithm. In this example and/or other examples, the RF signal detection subsystem may include a monopulse tracker configured to determine the angle of arrival of the prioritized RF signal. In this example and/or other examples, the signal-forming subsystem may be configured to place the radiation null at the angle of arrival in the radiation pattern of the non-prioritized RF signal using at least one of a linearly constrained minimum variance (LCMW) algorithm, a minimum variance distortionless response (MVDR) algorithm, or a Frost beamformer algorithm.

In another example, a method comprises detecting an airborne radar signal, via an antenna array, determining an angle of arrival of the airborne radar signal, and outputting a beamformed signal based at least on the angle of arrival of the airborne radar signal, wherein a radiation null is formed along the angle of arrival of the airborne radar signal in a radiation pattern of the beamformed signal. In this example and/or other examples, the airborne radar signal may be a first airborne radar signal, and the method may further comprise detecting, via the antenna array, a second airborne radar signal from a same source as the first airborne radar signal, determining an angle of arrival of the second airborne radar signal, and outputting an updated beamformed signal based at least on the angle of arrival of the second airborne radar signal, wherein a radiation null is formed along the angle of arrival of the second airborne radar signal in the radiation pattern of the updated beamformed signal. In this example and/or other examples, the angles of arrival and/or the beamformed signal may be dynamically updated according to a designated update rate. In this example and/or other examples, the designated update rate may vary based at least on a distance between the source of the airborne radar signals and a cellular base station system that transmits the beamformed signal and a velocity of the source. In this example and/or other examples, the airborne radar signal may be a first airborne radar signal from a first source, and the method may further comprise detecting, via the antenna array, a second airborne radar signal from a second source, determining an angle of arrival of the second airborne radar signal, and the beamformed signal may be output based at least on the angle of arrival of the first airborne radar signal and the angle of arrival of the second airborne radar signal, a first radiation null may be formed along the angle of arrival of the first airborne radar signal and a second radiation null may be formed along the angle of arrival of the second airborne radar signal in the radiation pattern of the beamformed signal. In this example and/or other examples, the angle of arrival of the airborne radar signal may be determined using at least one of a multiple signal classification (MUSIC) algorithm or an estimation of signal parameters via rotational invariant techniques (ESPRIT) algorithm, and the radiation null may be placed at the angle of arrival using at least one of a linearly constrained minimum variance (LCMW) algorithm, a minimum variance distortionless response (MVDR) algorithm, or a Frost beamformer algorithm.

In yet another example, a computing system comprises a logic processor, a storage device holding instructions executable by the logic processor to detect a prioritized RF signal via an antenna array, determine an angle of arrival of the prioritized RF signal, and output a non-prioritized RF signal based at least on the angle of arrival of the prioritized RF signal, a radiation null is formed along the angle of arrival of the prioritized RF signal in a radiation pattern of the non-prioritized RF signal.

The present disclosure includes all novel and non-obvious combinations and subcombinations of the various features and techniques disclosed herein. The various features and techniques disclosed herein are not necessarily required of all examples of the present disclosure. Furthermore, the various features and techniques disclosed herein may define patentable subject matter apart from the disclosed examples and may find utility in other implementations not expressly disclosed herein.

The invention claimed is:

1. A system comprising:
    an antenna array;
    a radio frequency (RF) signal detection subsystem configured to 1) repeatedly detect a prioritized RF signal in a prioritized RF spectrum band transmitted from a moving source and received via the antenna array, and 2) repeatedly determine an angle of arrival of the prioritized RF signal according to a designated update rate; and
    a signal-forming subsystem configured to 1) repeatedly output a non-prioritized RF signal based at least on the angle of arrival of the prioritized RF signal that is repeatedly determined according to the designated update rate and 2) repeatedly transmit, via the antenna array, the non-prioritized RF signal, wherein a radiation null is formed along the angle of arrival in a radiation pattern of the non-prioritized RF signal emitted by the antenna array;
    wherein the designated update rate varies based at least on a velocity of the moving source and a distance between the moving source and the antenna array of the system that transmits the non-prioritized RF signal.

2. The system of claim 1, wherein the prioritized RF signal is an airborne radar signal emitted by the moving source and the non-prioritized RF signal is a cellular signal.

3. The system of claim 1, wherein the signal-forming subsystem is configured to output a beamformed non-prioritized RF signal, and wherein a peak radiated power of the beamformed non-prioritized RF signal is directed toward a target in the radiation pattern of the beamformed non-prioritized RF signal.

4. The system of claim 1, wherein the signal-forming subsystem is configured to output the non-prioritized RF signal via signal hopping between different frequencies outside of the prioritized RF spectrum band.

5. The system of claim 1, wherein the signal-forming subsystem is configured to output the non-prioritized RF signal via RF multiplexing in different frequencies outside of the prioritized RF spectrum band.

6. The system of claim 1, wherein the angle of arrival is represented by an azimuth angle and an elevation angle.

7. The system of claim 1, wherein the moving source is a first moving source, wherein the prioritized RF signal is a first prioritized RF signal, wherein the designated update rate is a first designated update rate, wherein the RF signal detection subsystem is configured to 1) repeatedly detect a second prioritized RF signal transmitted from a second moving source and received via the antenna array, and 2) repeatedly determine an angle of arrival of the second prioritized RF signal according to a second designated update rate; and wherein the signal-forming subsystem is configured to repeatedly output the non-prioritized RF signal based at least on the angle of arrival of the first prioritized RF signal and the angle of arrival of the second prioritized RF signal, wherein a first radiation null is formed along the angle of arrival of the first prioritized RF signal and a second radiation null is formed along the angle of arrival of the second prioritized RF signal in the radiation pattern of the non-prioritized RF signal, and wherein the second designated update rate varies based at least on a velocity of the second moving source and a distance between the second moving source and the antenna array of the system that transmits the non-prioritized RF signal.

8. The system of claim 1, wherein the RF signal detection subsystem is configured to determine the angle of arrival of the prioritized RF signal using at least one of a multiple signal classification (MUSIC) algorithm or an estimation of signal parameters via rotational invariant techniques (ESPRIT) algorithm.

9. The system of claim 1, wherein the RF signal detection subsystem includes a monopulse tracker configured to determine the angle of arrival of the prioritized RF signal.

10. The system of claim 1, wherein the signal-forming subsystem is configured to place the radiation null at the angle of arrival in the radiation pattern of the non-prioritized RF signal using at least one of a linearly constrained minimum variance (LCMW) algorithm, a minimum variance distortionless response (MVDR) algorithm, or a Frost beamformer algorithm.

11. A method comprising:
repeatedly detecting an airborne radar signal, via an antenna array, wherein the airborne radar signal is transmitted from a moving source and received via the antenna array;
repeatedly determining an angle of arrival of the airborne radar signal according to a designated update rate;
repeatedly outputting a beamformed signal based at least on the angle of arrival of the airborne radar signal that is repeatedly determined according to designated update rate; and
repeatedly transmitting, via the antenna array, the beamformed signal, wherein a radiation null is formed along the angle of arrival of the airborne radar signal in a radiation pattern of the beamformed signal;
wherein the designated update rate varies based at least on a velocity of the moving source and a distance between the moving source and the antenna array that transmits the beamformed signal.

12. The method of claim 11, wherein the moving source is a first moving source, wherein the airborne radar signal is a first airborne radar signal, wherein the designated update rate is a first designated update rate, and wherein the method further comprises:
repeatedly detecting, via the antenna array, a second airborne radar signal from a second moving source;
repeatedly determining an angle of arrival of the second airborne radar signal according to a second designated update rate; and
wherein the beamformed signal is repeatedly output based at least on the angle of arrival of the first airborne radar signal and the angle of arrival of the second airborne radar signal, wherein a first radiation null is formed along the angle of arrival of the first airborne radar signal and a second radiation null is formed along the angle of arrival of the second airborne radar signal in the radiation pattern of the beamformed signal;
wherein the second designated update rate varies based at least on a velocity of the second moving source and a distance between the second moving source and the antenna array.

13. The method of claim 11, wherein the angle of arrival of the airborne radar signal is determined using at least one of a multiple signal classification (MUSIC) algorithm or an estimation of signal parameters via rotational invariant techniques (ESPRIT) algorithm, and wherein the radiation null is placed at the angle of arrival using at least one of a linearly constrained minimum variance (LCMW) algorithm, a minimum variance distortionless response (MVDR) algorithm, or a Frost beamformer algorithm.

14. A computing system comprising:
a logic processor;
a storage device holding instructions executable by the logic processor to:
repeatedly detect a prioritized RF signal via an antenna array, wherein the prioritized RF signal is transmitted from a moving source and received via the antenna array;
repeatedly determine an angle of arrival of the prioritized RF signal according to a designated update rate; and
repeatedly output a non-prioritized RF signal based at least on the angle of arrival of the prioritized RF signal that is repeatedly determined according to the designated update rate;
wherein a radiation null is formed along the angle of arrival of the prioritized RF signal in a radiation pattern of the non-prioritized RF signal transmitted via the antenna array; and
wherein the designated update rate varies based at least on a velocity of the moving source and a distance between the moving source and the antenna array that transmits the non-prioritized RF signal.

15. The system of claim 1, wherein the designated update rate increases as the distance between the moving source and the antenna array of the system that transmits the non-prioritized RF signal decreases.

16. The system of claim 1, wherein the designated update rate increases as the velocity of the moving source increases.

17. The system of claim 1, wherein the moving source is an aircraft.

18. The method of claim 11, wherein the designated update rate increases as the distance between the moving source and the antenna array that transmits the beamformed signal decreases.

19. The method of claim 11, wherein the designated update rate increases as the velocity of the moving source increases.

20. The method of claim 11, wherein the moving source is an aircraft.

* * * * *